United States Patent
Gasparini et al.

(10) Patent No.: US 8,795,123 B2
(45) Date of Patent: Aug. 5, 2014

(54) EPICYCLIC GEAR TRAIN FOR AN AIRCRAFT CAPABLE OF HOVERING

(71) Applicant: AgustaWestland S.p.A., Samarate (IT)

(72) Inventors: Giuseppe Gasparini, Samarate (IT); Alberto La Fortezza, Samarate (IT); Dario Colombo, Samarate (IT)

(73) Assignee: AgustaWestland S.p.A., Samarate (IT)

( * ) Notice: Subject to any disclaimer, the term of this patent is extended or adjusted under 35 U.S.C. 154(b) by 0 days.

(21) Appl. No.: 13/728,666

(22) Filed: Dec. 27, 2012

(65) Prior Publication Data

US 2013/0172143 A1     Jul. 4, 2013

(30) Foreign Application Priority Data

Dec. 30, 2011 (EP) .................................. 11425316

(51) Int. Cl.
*F16H 57/04* (2010.01)
*B64C 27/12* (2006.01)

(52) U.S. Cl.
CPC ............ *F16H 57/04* (2013.01); *F16H 57/0456* (2013.01); *B64C 27/12* (2013.01); *F16H 57/0486* (2013.01)

USPC ............................................. 475/159

(58) Field of Classification Search
None
See application file for complete search history.

(56) References Cited

U.S. PATENT DOCUMENTS

| 6,579,202 B2 * | 6/2003 | El-Antably et al. ......... 475/159 |
| 2011/0299974 A1 | 12/2011 | Gauthier et al. |
| 2013/0035197 A1 * | 2/2013 | Sartori et al. ................ 475/344 |

FOREIGN PATENT DOCUMENTS

FR         2685758         7/1993

* cited by examiner

*Primary Examiner* — Dirk Wright
(74) *Attorney, Agent, or Firm* — Leason Ellis LLP

(57) ABSTRACT

An epicyclic gear train, for an aircraft capable of hovering, having a sun gear rotating about a first axis; a fixed ring gear positioned coaxially with the first axis and radially outwards with respect to the sun gear; a number of planet gears, which are interposed between and mesh with the sun gear and the ring gear, and rotate about respective second axes, in turn revolving about the first axis; and lubricant feed means; the feed means having a number of nozzles arranged about the first axis and the sun gear to produce an annular flow of lubricant.

10 Claims, 7 Drawing Sheets

EPICYCLIC GEAR TRAIN FOR AN AIRCRAFT CAPABLE OF HOVERING

The present invention relates to an epicyclic gear train for an aircraft capable of hovering, such as a convertiplane or a helicopter, to which the following description refers purely by way of example.

BACKGROUND OF THE INVENTION

As is known, helicopters are normally equipped with a number of transmissions for transmitting power from one or more turbines to the main and/or tail rotor, and/or from the turbine to accessory devices, i.e. for supplying the energy needed, for example, to operate on-board equipment.

One transmission is normally interposed between the turbine and the main rotor drive shaft.

The final reduction stage of this transmission is normally an epicyclic reduction gear for transmitting power with adequate torque and speed to the rotor shaft.

An epicyclic reduction gear substantially comprises:
a first or sun gear, which rotates about a fixed first axis;
a fixed second or ring gear coaxial with the first axis; and
a number of planet gears, which mesh with the sun and ring gears, and rotate about respective movable second axes parallel to the first axis.

The above epicyclic reduction gear also comprises a planet carrier, which rotates about the first axis and is connected to the planet gears.

In this way, in addition to rotating about their respective second axes, the planet gears also revolve about the first axis of the sun gear.

More specifically, the sun gear is connected to an input shaft, and the planet carrier acts as an output shaft connected to the rotor shaft.

In other words, mechanical power enters the epicyclic reduction gear via the sun gear, and is transmitted at the right torque and speed to the rotor shaft by the planet carrier.

The sun gear, ring gear, and planet gears are all mounted on an annular bottom supporting plate, and are oil lubricated by nozzles fitted to two bars fixed to the plate, radially with respect to the first axis, and extending from the outer periphery of the sun gear.

Because of the location of the nozzles, in two predetermined positions with respect to the sun gear, and the size of the planet gears, the space for oil flow from the nozzles is extremely limited, thus preventing constant lubrication of the meshing sun gear and plane gear teeth, and so resulting in poor lubrication, particularly of the sun gear, which normally performs a number of meshing cycles per revolution.

US 2011/0299974A1 discloses an epicyclic gear train.

SUMMARY OF THE INVENTION

It is an object of the present invention to provide an epicyclic gear train, for an aircraft capable of hovering, which is designed to eliminate the above drawback cheaply and easily.

According to the present invention, there is provided an epicyclic gear train, for an aircraft capable of hovering.

The present invention also relates to an aircraft capable of hovering.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
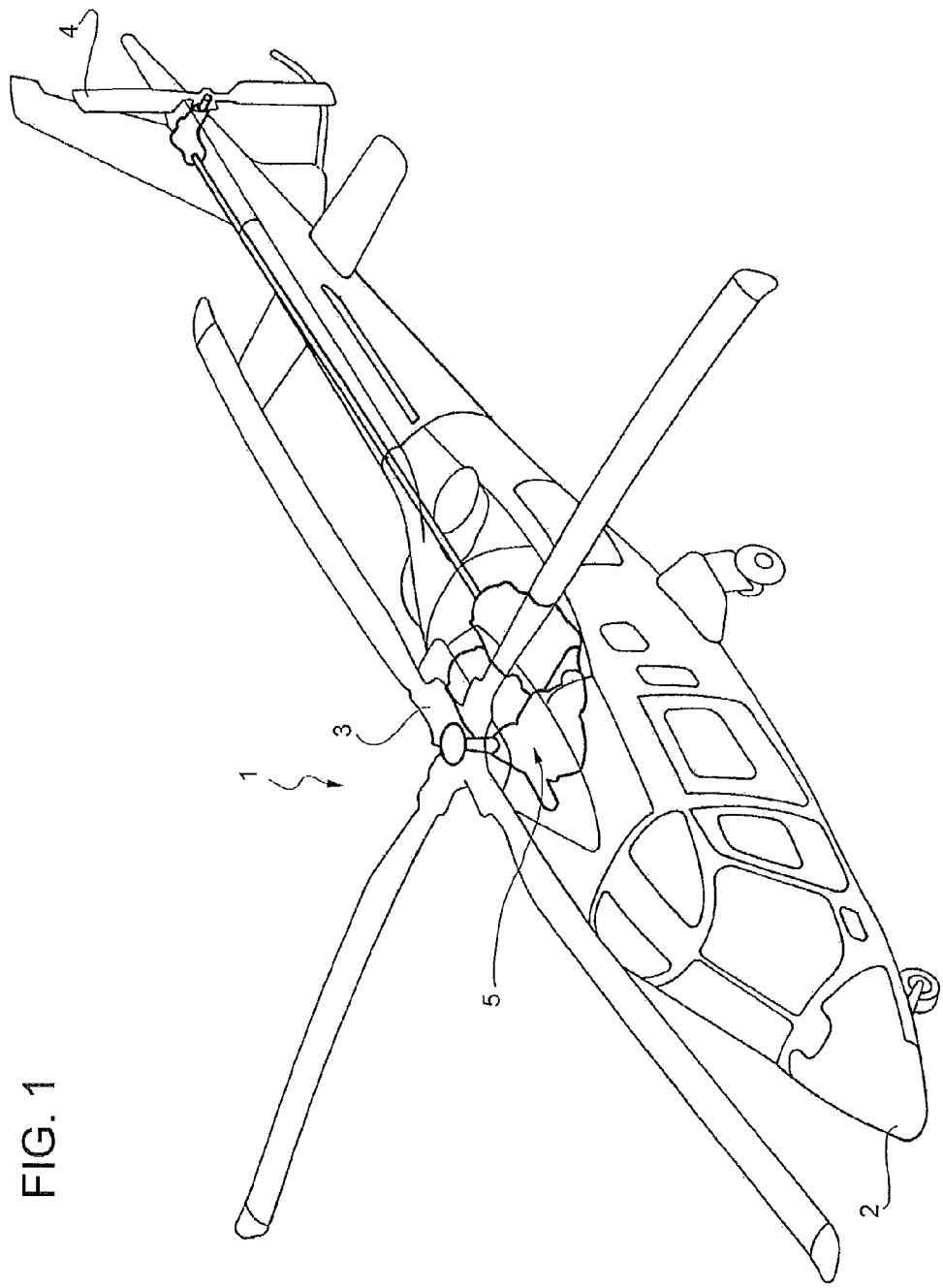
FIG. 1 shows a view in perspective of a hover aircraft, in particular a helicopter, comprising an epicyclic gear train in accordance with the present invention.

Number 1 in FIG. 1 indicates as a whole an aircraft capable of hovering—in the example shown, a helicopter.

Helicopter 1 substantially comprises a fuselage 2; a main rotor 3 mounted on fuselage 2 to rotate in a first plane and sustain the helicopter as a whole; and a tail rotor 4 mounted at the rear end of fuselage 2, and which rotates in a second plane, crosswise to the first plane, to counteract rotation of fuselage 2 by rotor 3.

Helicopter 1 also comprises a main transmission 5 for transmitting power from a turbine (not shown) to the drive shaft (not shown) of rotor 3; and an auxiliary transmission powered by transmission 5 and in turn powering rotor 4.

Figure 2:
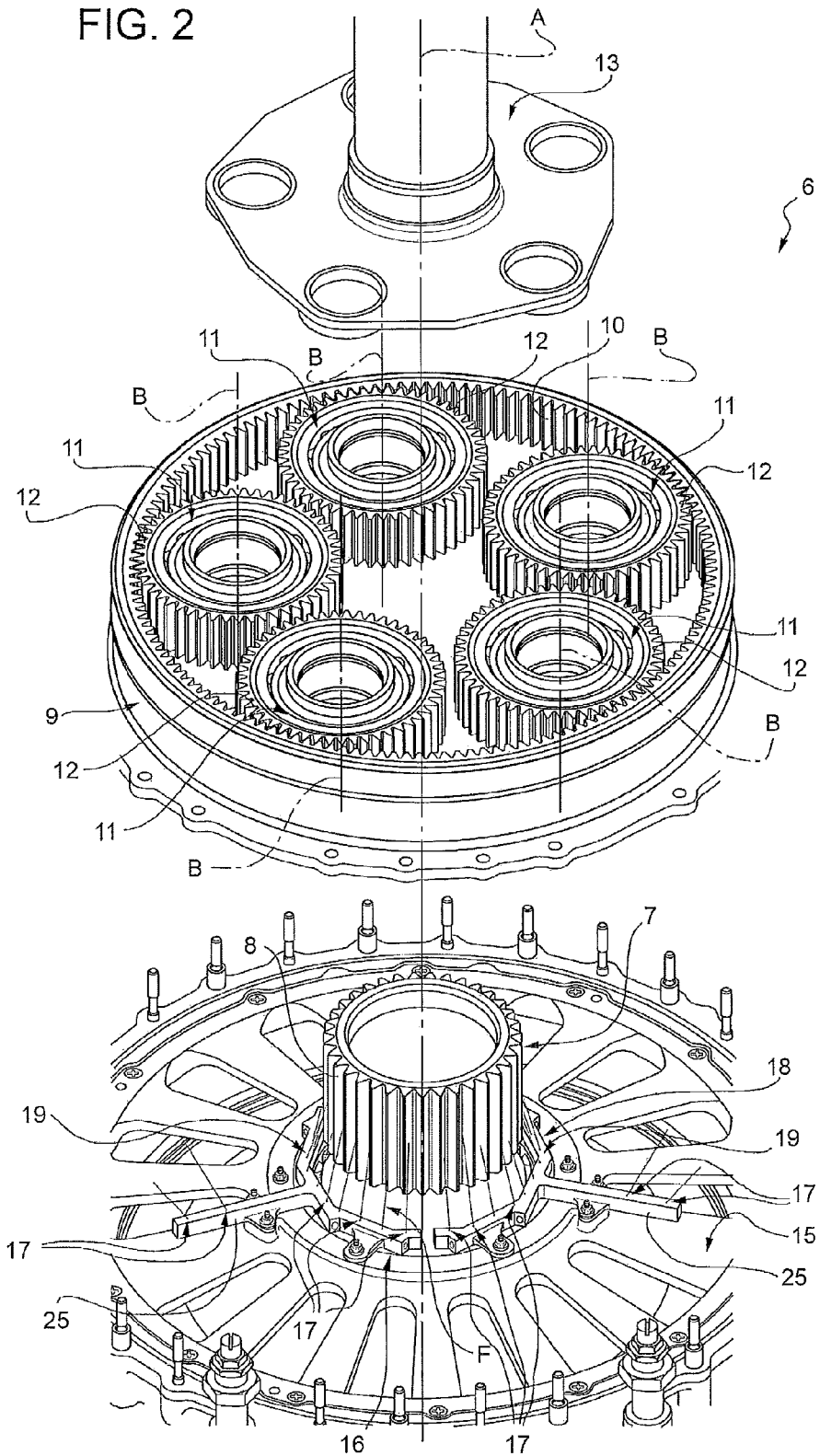
FIG. 2 shows an exploded view in perspective of the epicyclic gear train incorporated in the FIG. 1 aircraft.
Figure 3:
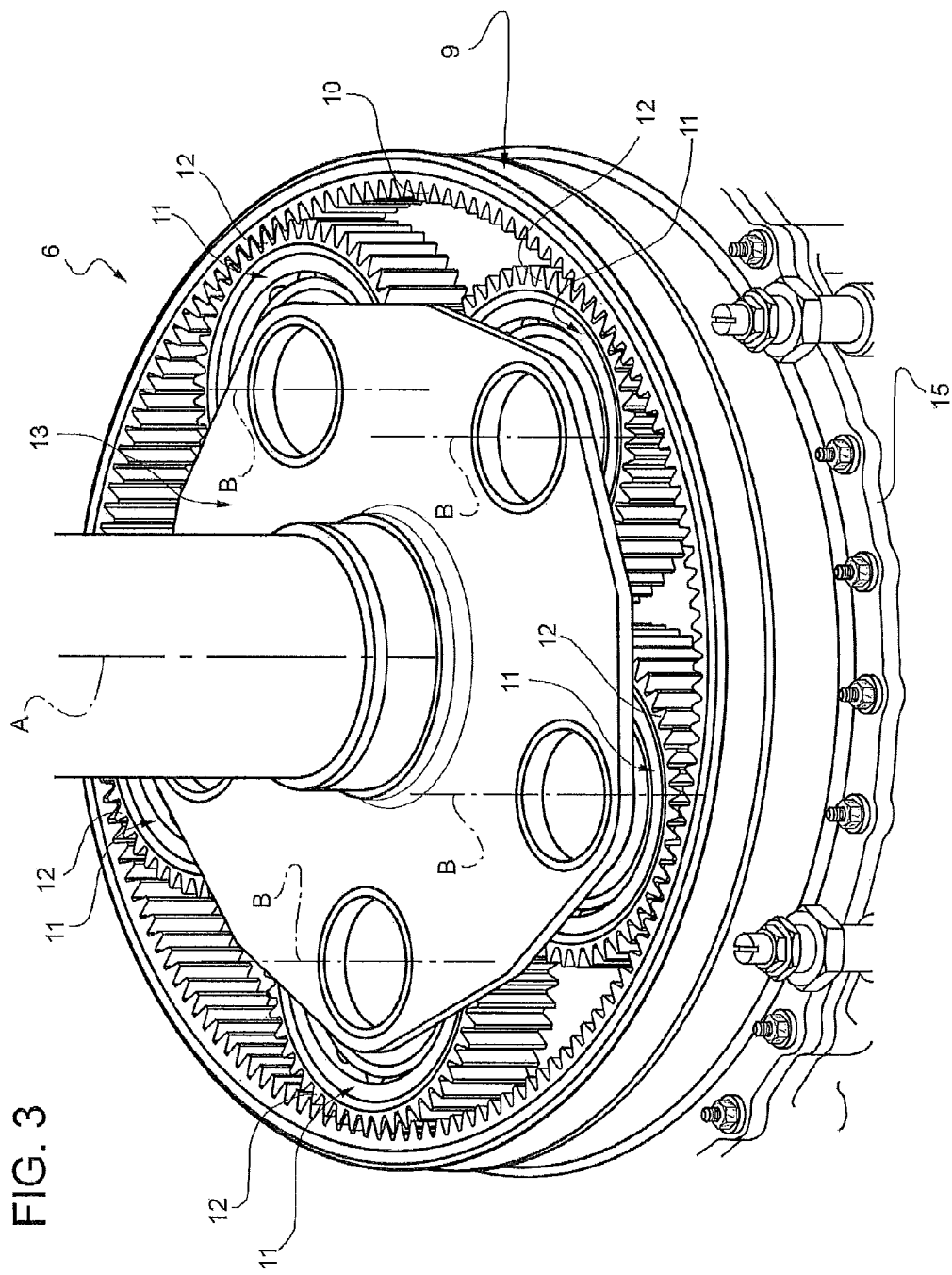
FIG. 3 shows a larger-scale view in perspective of the FIG. 2 epicyclic gear train in use.
Figure 4:
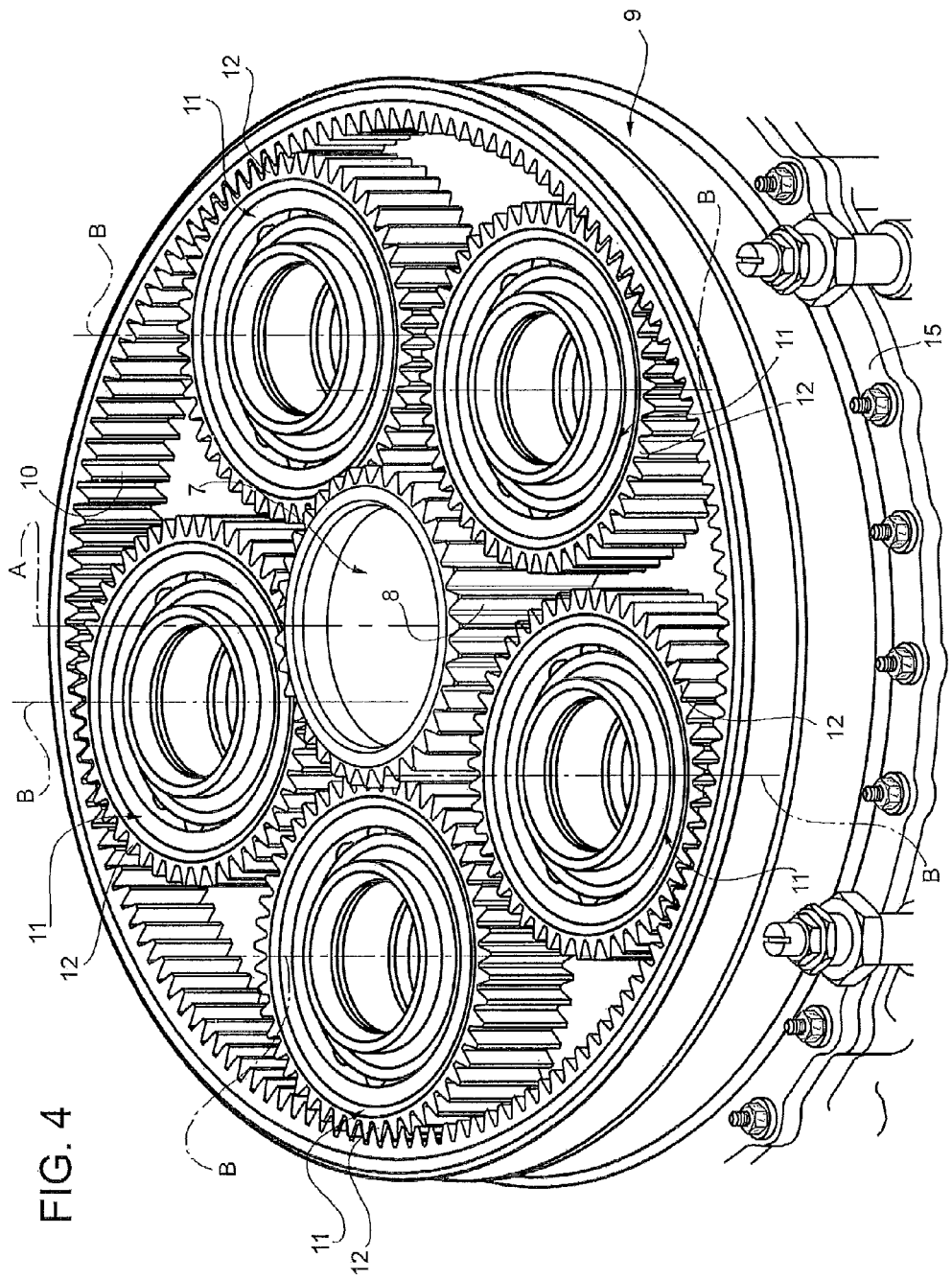
FIGS. 4 and 5 show larger-scale views in perspective, with parts removed for clarity, of the FIG. 3 epicyclic gear train.

Transmission 5 comprises a final stage substantially defined by an epicyclic gear train 6 (FIGS. 2 and 3), which transmits power with the right torque and angular speed to the drive shaft of rotor 3.

In the example shown, epicyclic gear train 6 is a reduction gear.

With particular reference to FIGS. 2-5, epicyclic gear train 6 substantially comprises:
a sun gear 7, which has external teeth 8, rotates about an axis A, and is connected functionally to an input shaft (not shown) of the stage of which gear train 6 forms part;
a fixed ring gear 9 having internal teeth 10 and extending, coaxially with axis A, about sun gear 7;
a number of—in the example shown, five—planet gears 11, which have respective external teeth 12, rotate about respective axes B parallel to axis A, and mesh with gun gear 7 and ring gear 9; and
a planet carrier 13, which rotates about axis A, is connected directly to the drive shaft (not shown) of rotor 3, and is connected to planet gears 11.

Ring gear 9 is larger in diameter than sun gear 7, and planet gears 11 are interposed between ring gear 9 and sun gear 7.

Each planet gear 11 rotates about its own axis B, and revolves about axis A, i.e. axes B are movable about axis A.

Mechanical power enters epicyclic gear train 6 via sun gear 7, and exits, towards the shaft of rotor 3 and with the right torque and speed, via planet carrier 13.

More specifically, as each planet gear 11 rotates about respective axis B and revolves about axis A, the external teeth 12 of planet gears 11 mesh cyclically with the external teeth 8 of sun gear 7 and the internal teeth 10 of ring gear 9.

As shown in FIGS. 2-5, ring gear 9 is fixed to an annular plate 15, of axis A, located beneath ring gear 9, sun gear 7, planet gears 11 and planet carrier 13.

As shown in FIGS. 2, 5, 6 and 7, gear train 6 also comprises a lubricant—typically oil—feed device 16 fixed to plate 15.

Figure 5:
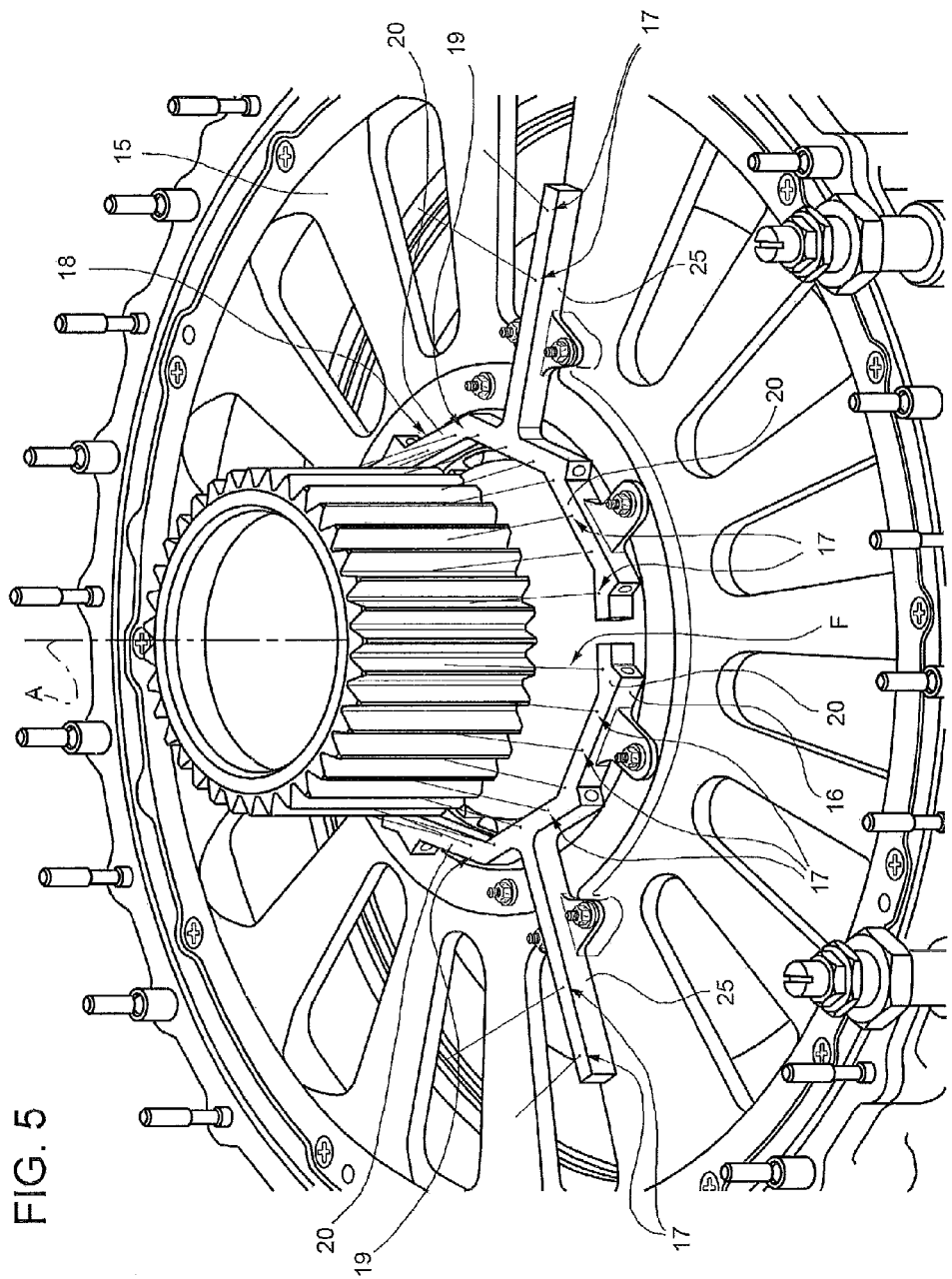
Figure 6:
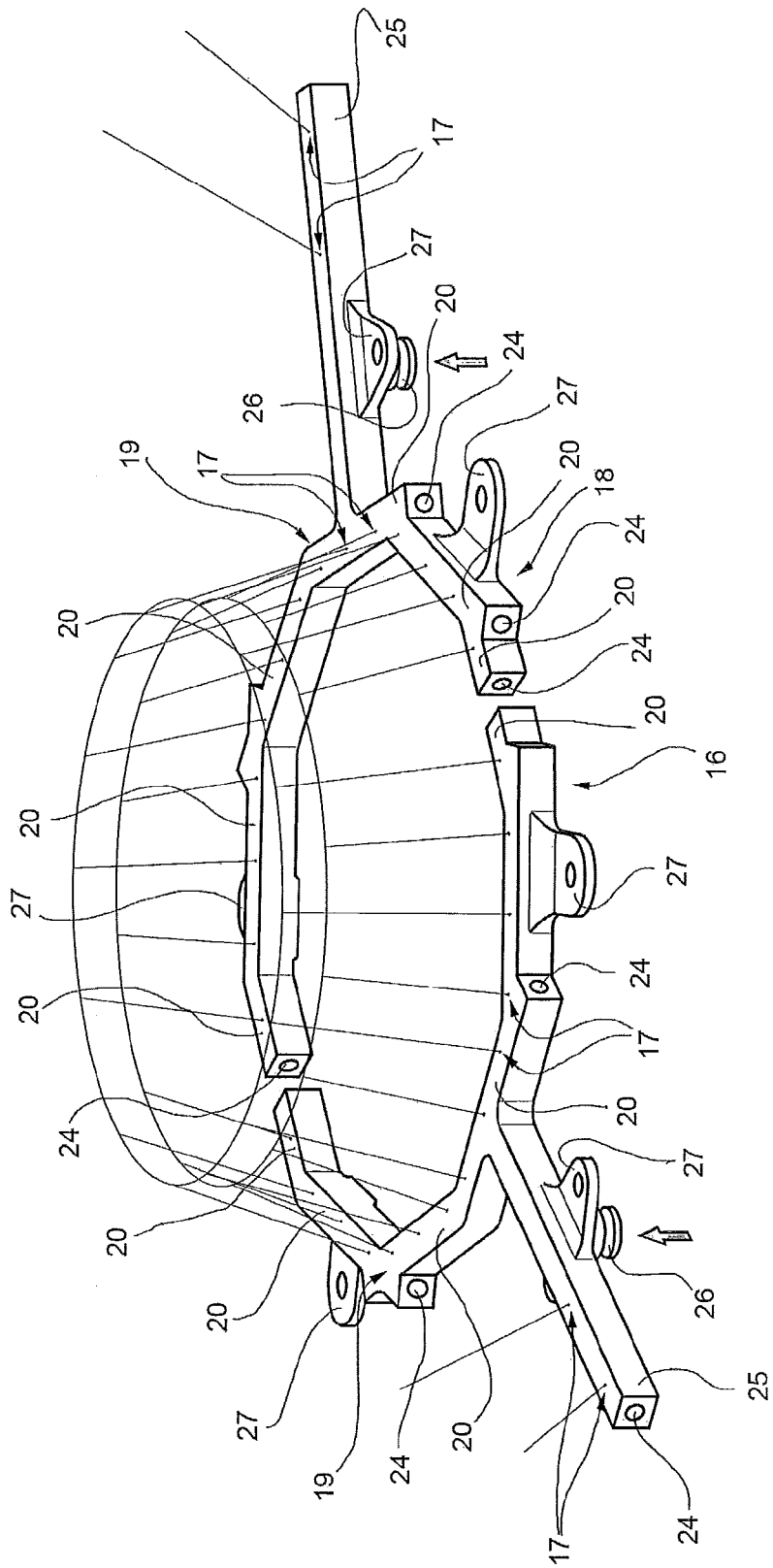
FIG. 6 shows a larger-scale view in perspective of a detail in FIG. 5.

An important feature of the present invention is that device 16 comprises a number of nozzles 17 arranged about axis A and sun gear 7 to produce an annular flow F of lubricant (FIGS. 5 and 6).

More specifically, nozzles 17 are formed on a distributor 18 extending about axis A.

In a preferred embodiment of the invention, distributor 18 comprises two substantially C-shaped conduits 19 located on diametrically-opposite sides of axis A with their respective concavities facing.

More specifically, conduits 19 form two halves of distributor 18, and are each formed in one piece with a jagged profile.

As shown in FIGS. 2, 5, 6 and 7, each conduit 19 comprises a number of straight portions 20, each of which forms an angle of less than 180° with the adjacent straight portion/s 20, and each of which has a longitudinal hole 21 connected to the longitudinal hole/s 21 of the adjacent straight portion/s 20 to allow throughflow of the lubricant.

Figure 7:
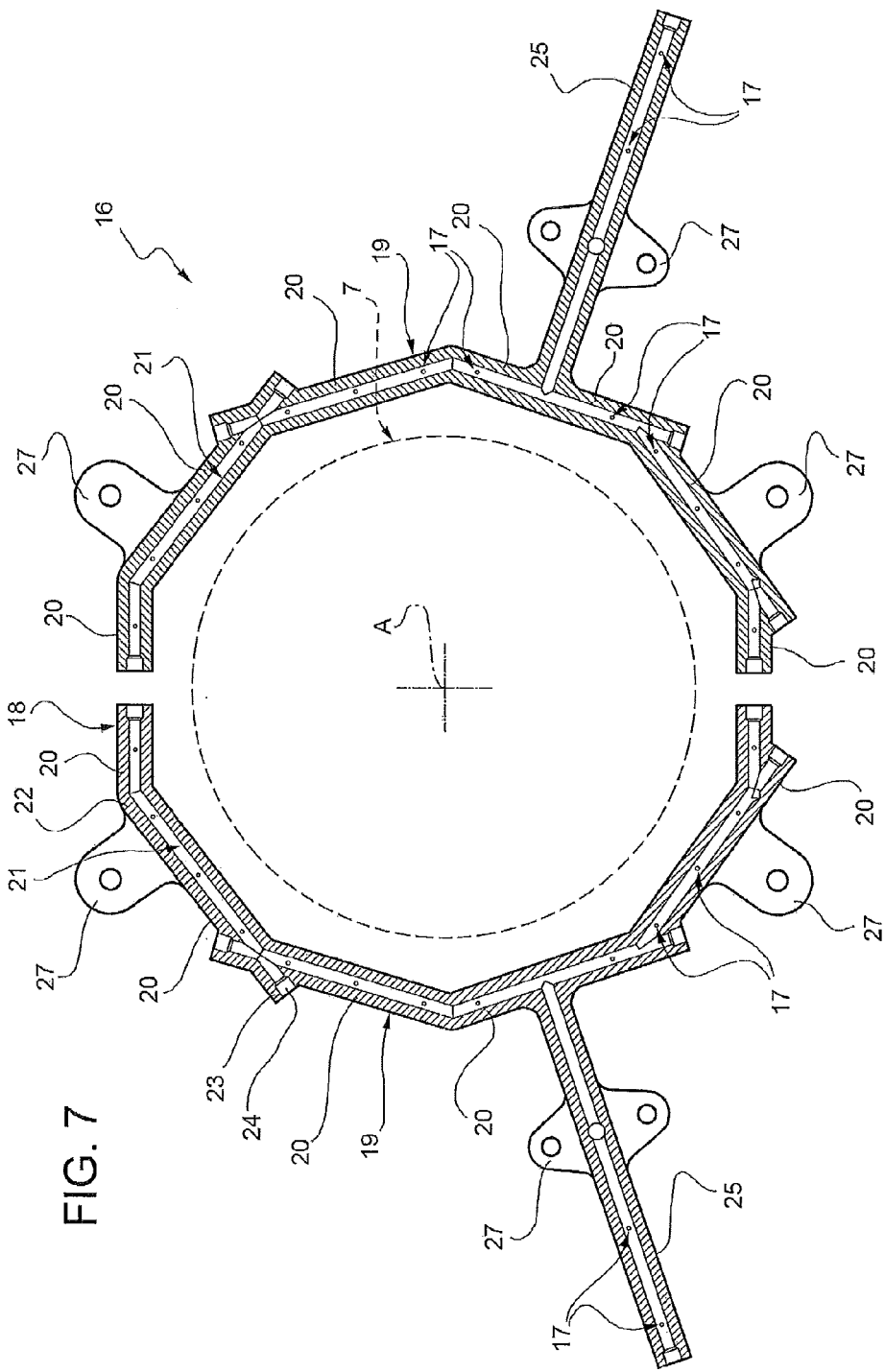
FIG. 7 shows a horizontal section of the FIG. 6 detail.

As shown in FIGS. 5, 6 and 7, each straight portion 20 has one end 22 connected to the longitudinal hole 21 of an adjacent straight portion 20; and an opposite, outwardly-open end 23 accessible from the outside and sealed, in use, by a respective plug 24.

Each conduit 19 may thus be formed from a solid body, which is drilled along each straight portion 20, from end 23 accessible from the outside; and the resulting holes 21 are then sealed with respective plugs 24.

Nozzles 17 are defined by transverse holes formed in straight portions 20 of conduits 19 and communicating with longitudinal holes 21.

For each conduit 19, distributor 18 comprises a branch 25 projecting from conduit 19, in the opposite direction to the other conduit 19, and having a lubricant feed inlet 26. Branches 25 are also provided with nozzles 17.

Conduits 19 and branches 25 of distributor 18 have lateral flanges 27 for assembly to plate 15 underneath.

In actual use, power enters epicyclic gear train 6 via sun gear 7, which rotates about axis A.

As sun gear 7 rotates, planet gears 11 rotate about respective axes B and revolve about axis A, and teeth 12 of planet gears 11 mesh with teeth 10 of fixed ring gear 9.

Planet carrier 13 thus rotates about axis A to transmit power at the right speed to the shaft of rotor 3.

During operation, the lubricant from nozzles 17 thoroughly lubricates the external teeth 8 of sun gear 7 and the external teeth 12 of planet gears 11 in any meshing condition.

The advantages of epicyclic gear train 6 according to the present invention will be clear from the above description.

In particular, the annular arrangement of nozzles about sun gear 7 permits constant lubrication of external teeth 8 and 12 of sun gear 7 and planet gears 11.

The way in which distributor 18 is constructed provides for minimizing the material thickness around longitudinal holes 21 (as compared, for example, with a solution obtained by casting), thus minimizing the overall weight of gear train 6 and avoiding the sealing problems typically associated with solutions involving welded tubular members.

Clearly, changes may be made to epicyclic gear train 6 as described and illustrated herein without, however, departing from the protective scope defined in the accompanying Claims.

In particular, epicyclic gear train 6 may be used on a convertiplane.

The invention claimed is:

1. An epicyclic gear train (6), for an aircraft (1) capable of hovering, comprising:
   a sun gear (7) rotating about a first axis (A) and having external teeth (8);
   a fixed ring gear (9) having internal teeth (10) and positioned coaxially with said first axis (A) and radially outwards with respect to said sun gear (7);
   a number of planet gears (11), which have respective external teeth (12), are interposed between and mesh with the teeth (8, 10) of said sun gear (7) and said ring gear (9), and rotate about respective second axes (B), in turn revolving about said first axis (A); and
   lubricant feed means (16) comprising a number of nozzles (17) arranged about said first axis (A) and said sun gear (7) to produce a flow (F) of said lubricant;
   the gear train being characterized in that said flow is an annular flow; and
   wherein said feed means (16) comprises a distributor (18) extending about said first axis (A) and having said nozzles (17), said distributor (18) comprising two substantially C-shaped conduits (19) located on diametrically-opposite sides of said first axis (A) with their respective concavities facing.

2. A gear train as claimed in claim 1, wherein said conduits (19) form two halves of said distributor (18).

3. A gear train as claimed in claim 1, wherein each said conduit (19) has a jagged profile and is formed in one piece.

4. A gear train as claimed in claim 3, wherein each said conduit (19) comprises a number of straight portions (20), each forming an angle of less than 180° with the adjacent straight portion/s (20).

5. A gear train as claimed in claim 4, wherein each said straight portion (20) has a longitudinal hole (21) communicating with the longitudinal hole/s (21) of the adjacent straight portion's (20) to permit throughflow of said lubricant.

6. A gear train as claimed in claim 5, wherein each said straight portion (20) has one end (22) connected to the longitudinal hole (21) of an adjacent straight portion (20); and an opposite, outwardly-open end (23) accessible from the outside and sealed, in use, by a respective plug (24).

7. A gear train as claimed in claim 5, wherein said nozzles (17) are defined by transverse holes formed in said straight portions (20) of said conduits (19) and communicating with said longitudinal holes (21).

8. A gear train as claimed in claim 1, wherein, for each said conduit (19), said distributor (18) comprises a branch (25) projecting from the conduit (19), in the opposite direction to the other said conduit (19), and having a feed inlet (26) for said lubricant.

9. A gear train as claimed in claim 1, wherein said ring gear (9) is fixed to a supporting plate (15) supporting said feed means (16).

10. An aircraft (1) capable of hovering comprising:
   a rotor (3);
   a drive member; and
   a transmission (5) interposed between said rotor (3) and said drive member, and comprising an epicyclic gear train (6) as claimed in claim 1;
   said epicyclic gear train (6) comprising a planet carrier (13) connected to said planet gears (11);
   either one (7) of said sun gear (7) and said planet carrier (13) receiving a torque from said drive member;
   and the other (13) of said sun gear (7) and said planet carrier (13) being connected to a drive shaft of said rotor (3).

* * * * *